May 10, 1949.  W. P. LEAR  2,469,970
DIRECTIONAL RADIO RECEIVER SYSTEM
Original Filed Nov. 27, 1939
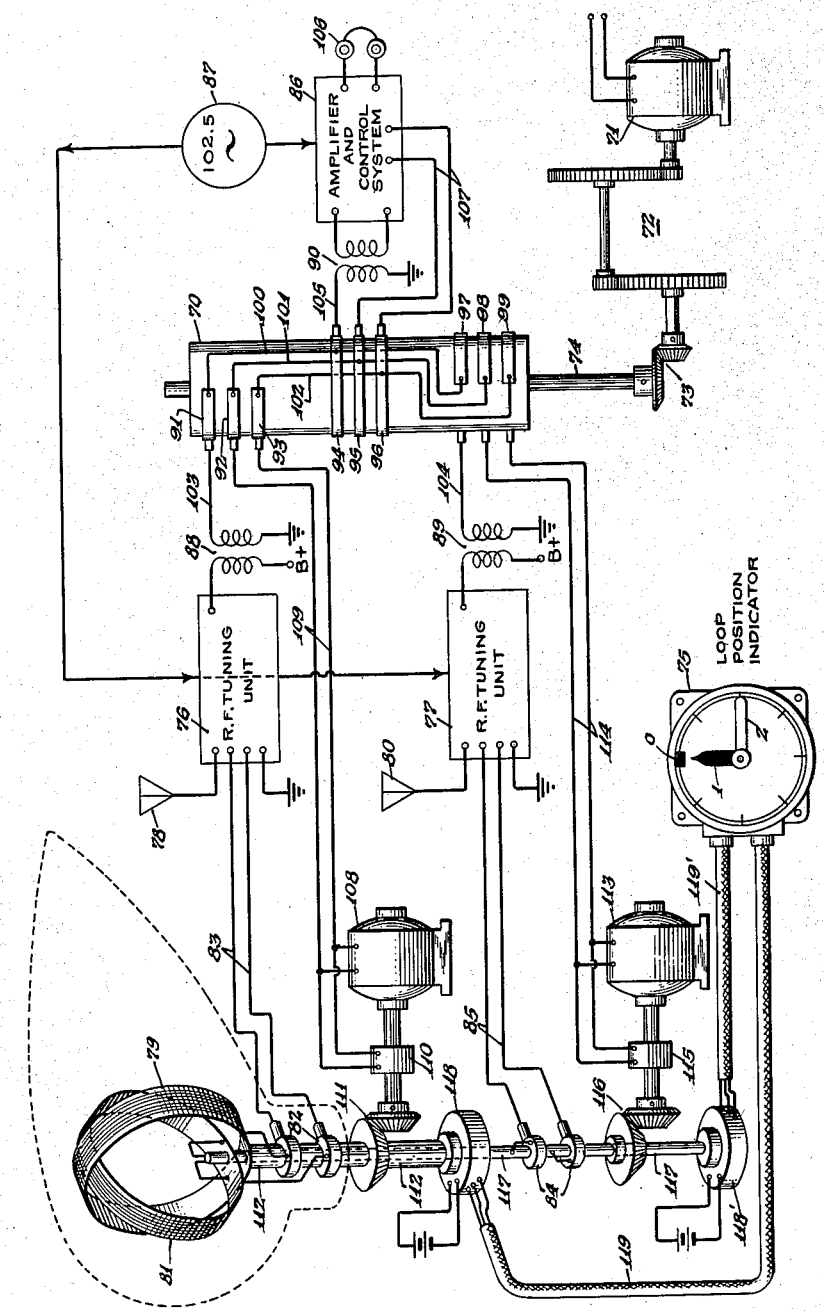
INVENTOR.
William P. Lear
BY
ATTORNEY.

Patented May 10, 1949

2,469,970

UNITED STATES PATENT OFFICE 2,469,970

DIRECTIONAL RADIO RECEIVER SYSTEM

William P. Lear, North Hollywood, Calif., assignor, by mesne assignments, to Lear, Incorporated, Grand Rapids, Mich., a corporation of Illinois Original application November 27, 1939, Serial No. 306,315, now Patent No. 2,379,363, dated June 26, 1945. Divided and this application August 28, 1943, Serial No. 500,332

16 Claims. (Cl. 343—117)

1

This invention relates to radio guidance receiver systems for mobile craft, and more particularly to novel radio instrument approach receiver systems for guiding an aircraft to a landing runway, a marine vessel into a slip, and the like. This case is a division of my copending application Serial No. 306,315 filed November 27, 1939, now Patent No. 2,379,363, granted June 26, 1945.

In accordance with my present invention, I provide a radio instrument approach receiver system which continuously indicates to the pilot his relative lateral position with respect to his destination in general, and his position with respect to the approach path to the destination. Two spaced non-directional transmitters are placed in line with the approach path. The receiver system is simultaneously tuned to both transmitters and has two needle indicators arranged to continuously and independently point out the direction to each of the transmitters. The pilot is thus continuously made aware of his position.

In accordance with the present invetnion, the two transmitter stations have different radio frequencies and continuously radiate non-directionally. Two rotatable directional antennae aboard the aircraft separately receive the radio signals, and are automatically controlled by a receiver system to maintain a predetermined null signal or bearing position with respect to the transmitters. Two separate automatic radio direction indicators, one tuned to each of the ground stations, are used with a composite indicator having a separate needle continuously controlled by each direction finder.

A common amplifier system is used and continuously operating switching means is arranged between the two tuning units and the common amplifier system, successively connecting each tuning unit to the amplifier at a predetermined rate to maintain the individual loop antennae and associated indicators in bearing relationship with corresponding transmitters. The switching action may be performed mechanically or electrically.

It is among the objects of the present invention to provide a novel lateral position radio indication system comprising two separate directional indicators; to provide a novel radio lateral position system continuously effective in apprizing the pilot of his exact relative position with respect to transmitter stations; to provide a novel radio guidance system employing two separate radio frequency tuning units and a common amplifier and control arrangement; and to provide a novel radio guidance system employing two radio frequency tuning units and a common amplifier and control system therefor with means for effecting successive connection between the tuning units of the amplifier.

These and further objects of the present invention will become apparent in the following description of the embodiment shown in the accompanying drawing. In the drawing, the single figure illustrates the radio guidance receiver system of the present invention.

The radio guidance receiver system of the present invention is adapted to operate in the manner described in detail in connection with Fig. 1 of my said Patent No. 2,379,363.

The receiver system schematically illustrated in the drawing is employed in conjunction with ground stations having two separate radio frequency carrier waves radiating continuously. Separate radio frequency tuning units are used for both stations and a common amplifier and control system is used for both tuning units. The synchronous switching action, successively connecting the common amplifier-control system with the output of the radio frequency tuning units, is effected locally in the receiver. The synchronous switching means may be mechanical or electronic and is designed to switch the amplifier and control unit at predetermined intervals of equal duration, preferably in the range of one-third to one-half of a second, giving bearing indications closely corresponding with the desired lateral guidance indications.

In the illustrated system, an electromechanical switching means is used, comprising continuously rotated drum contactor 70 driven by motor 71 through reduction gearing 72 and bevel gearing 73 connected to shaft 74 of the drum. Motor 71 is a constant speed motor of any preferred type suitably energized by a local source of the aircraft or vessel. Drum 70 is rotated at the rate of about two to three revolutions per second in the preferred case, to properly actuate indicator needles 1 and 2 of composite indicator 75 in accordance with the directional indications of the system, as will be described.

The radio system comprises two separate radio frequency tuning units 76 and 77. Units 76 and 77 have individual tuning controls whereby the pilot tunes to the predetermined frequencies of the respective ground stations. A rotatable directional antenna and a non-directional antenna is connected to the input of each radio frequency tuning unit. Non-directional antenna 78 and loop antenna 79 are connected to radio frequency tuning unit 76. Loop antenna 79 is connected to unit 76 through slip rings 82 and connection leads 83. Loop 81 is connected to unit 77 through slip rings 84 and connection leads 85.

A single amplifier and control system 86 is employed for the receiver to conserve weight, bulk, and cost. A local source of audio frequency current 87 is used to produce the proper control signals for operating the loop antennae to their bearing positions. A frequency of 102.5 cycles has been found satisfactory. The schematic showing of the connection of generator 87 with units 76, 77 and 86 signifies its suitable connection in the circuit in a manner preferably as disclosed in my United States Patent No. 2,308,521 issued January 19, 1943 and my copending application, Serial Number 291,807, now Patent No. 2,379,362, granted June 26, 1945.

The output of radio frequency tuning units 76 and 77 is at the chosen intermediate frequency common to the system. The mechanical or electronic switching operation of the outputs of units 76, 77 is thus performed more efficiently than at radio frequency. The output of unit 76 is connected to intermediate frequency transformer 88; the output of unit 77, to intermediate frequency transformer 89. Unit 86 comprises an intermediate frequency amplifier, rectifier, audio frequency amplifier, and electronic or thyratron control system. The latter unit is actuated to control the movement of the loop antennae into the bearing positions. An intermediate frequency transformer 90 connects to the input of system 86. The outputs of intermediate frequency transformers 88 and 89 are successively connected to the input of intermediate frequency transformer 90 through the switching means 70.

The drum commutator 70 comprises a plurality of commutator segments, arranged in three groups. The first group contains 180° or semicircular segments 91, 92, 93. The intermediate group contains 360° or circular segments or rings 94, 95, 96. The third group comprises 180° or semi-circular segments 97, 98, 99. First group 91, 92, 93 correspond to radio frequency unit 76 and associated loop antenna system 79; the third group 97, 98, 99 corresponding to radio frequency unit 77 and associated loop antenna system 81.

Segments 91, 92, 93 are mechanically displaced by 180° with respect to segments 97, 98, 99. Only one of these two groups of segments can thus be in electrical contacting relationship with their associated brushes in alignment as shown. Continuous rotation of drum 70 causes alternate and successive connection and disconnection of radio frequency units 76, 77 and associated commutator segments. Commutator segments 91 and 97 are electrically connected with 360° segment or slip ring 94 through lead 100; segments 92 and 98, to ring 95 through lead 101; and segments 93 and 99, to ring 96 through lead 102.

The secondary winding of intermediate frequency transformer 88 is connectible to semicircular segment 91 through lead 103. The secondary winding of intermediate frequency transformer 89 is connectible to semi-circular segment 97 through lead 104. Only one of the two tuning units 76, 77 is connectible to intermediate frequency transformer 90 at any given instant due to the 180° phase displacement of their corresponding segments 91, 97 on drum 70. The primary of intermediate frequency transformer 90 is in continuous connection with slip ring 94 through lead 105, and thus with either lead 103 or lead 104 to one of the units 76, 77. The common amplifier control system 86 correspondingly serves both radio frequency tuning units 76 and 77 due to the successive connection thereto. As indicated, head phones 106 may be connected to system 86 for aural reception through the audio frequency section thereof.

The control signal output of system 86, derived from the directionally received signals as modified by local generator 87, is conducted to the respective loop antenna drive systems as follows: Output leads 107 of system 86 connect with slip rings 95, 96 through suitable brushes. Commutator segments 92, 93, in parallel connection with rings 95, 96, connect to motor 108 of loop antenna 79 through leads 109. Electromagnetic clutch 110 is in parallel connection with motor 108. Motor 108 drives loop antenna 79 through gearing 111 and loop sleeve 112. Motor 113 of the second loop antenna system 81 is connectible to segments 98, 99 through leads 114 and thence to the output of system 86. Electromagnetic clutch 115 is connected in parallel with motor 113. Motor 113 drives loop antenna 81 through clutch 115, gearing 116, and loop shaft 117. Loop shaft 117 is concentric with sleeve 112 due to the coaxial arrangement of the loop antenna windings. A streamline housing is indicated in dotted outline about the antennae upon external mounting thereof to reduce aerodynamic resistance in flight.

Simultaneous with the connection of the output of radio frequency tuning unit 76 to amplifier control system 86, motor 108 and electromagnetic clutch 110 of antenna system 79 are placed in electrical connection with the control output of system 86. During this interval, corresponding to the illustrated position of the drum 70, the other radio frequency tuning unit 77, its associated motor 113, and clutch 115, are disconnected from system 86. When unit 76 is tuned to the "inner" transmitter station, motor 108 is energized by system 86 to motivate loop antenna 79 into the null signal position or bearing relationship with the station in the manner disclosed in my Patent No. 2,308,521.

A telemetering unit is used to communicate the angular position of loop antenna 79 to "in" needle 1 of composite indicator 75. An electrical telemetering arrangement is illustrated, comprising position transmitter 118 connected to meter 75 through electrical cable 119, and a position translator or indicator located within meter 75. My Patent No. 2,379,362 describes in further detail arrangements for the telemetering and composite arrangement within meter 75. The chosen interval for the switching action of one-third to one-half of a second is ample in the practical embodiment to bring the loop antenna into null signal or bearing relationship with the transmitter station it is tuned to.

During the next succeeding interval, loop antenna system 79 and its associated tuning unit 76 are disconnected from amplifier control system 86. The loop antenna 79 thereupon remains stationary, as does its bearing indication by needle. The second radio frequency tuning unit 77 and its associated loop antenna system 81 including the motor drive therefor are thereupon connected with system 86 through commutator segments 97, 98, 99. Radio frequency tuning unit 77 is, in the present case, tuned to the carrier frequency of the second transmitter, namely the "outer" ground station. The output of system 86 operates motor 113 and magnetic clutch 115 to drive loop antenna 81 into the null signal position or bearing relationship with the transmitter. The position of loop antenna 81 is communicated to "out" indicator needle 2 through position transmitter 118' and electrical cable 119' connecting to the position translator within indicator 75.

Lateral guidance with the system of the invention is obtained in the manner described hereinabove in connection with Fig. 1 of my Patent Number 2,379,363, using transmitter stations with different carrier frequencies continuously radiated. The single amplifier control unit 86 is disclosed as mechanically switched between the two tuning units 76 and 77. The mechanical switching arrangement has been shown to simplify the disclosure of the principle involved in this form of the invention, namely that of switching the loop systems and indicators locally controlled at the receiving system. It is to be understood, however, that this is exemplary only, and that other equivalent switching arrangements either electrically, electronically or mechanically operated, may be used within the scope of the invention.

While one embodiment of the invention has been shown and described in detail to illustrate the application of the principles thereof, it will be obvious that the invention may be otherwise embodied without departing from such principles.

What is claimed is:

1. The method of radio guidance which comprises transmitting signals of different radio frequencies from a plurality of points; directionally receiving the different radio signals separately by the manipulation of a like plurality of antennas; successively connecting the separately received radio signals to a common system for amplifying them; deriving therefrom independent directional bearings on each of the points of radio transmission; and continuously maintaining each of such bearings.

2. The method of laterally guiding a mobile craft with respect to a predetermined path which comprises transmitting signals of different radio frequencies from two points spaced along the path; directionally receiving the different radio signals aboard the craft by the manipulation of a pair of antennas; successively and intermittently connecting the received radio signals to a common system for amplifying them; deriving therefrom independent directional bearings on each of the points of radio transmission with respect to the lateral position of the mobile craft; and continuously maintaining each of such bearings.

3. The method of laterally guiding an aircraft with respect to a predetermined path of approach to a runway which comprises transmitting signals of different radio frequencies from two points spaced along the path by a predetermined amount; directionally receiving the different radio signals aboard the aircraft by the manipulation of a pair of antennas; successively connecting the received radio signals for substantially equal intervals to a common system for amplifying them; deriving therefrom independent directional bearings on each of the transmitted radio signals with respect to the position of the aircraft; and continuously maintaining each of such bearings.

4. The method of laterally guiding an aircraft with respect to a predetermined path of approach to a runway which comprises transmitting signals of different radio frequencies from two points spaced along the path by a predetermined amount; directionally receiving the different radio signals aboard the aircraft by the manipulation of a pair of antennas; successively connecting the received radio signals for substantially equal intervals to a common system for amplifying them; deriving therefrom independent directional bearings on each of the transmitted radio signals with respect to the position of the aircraft; and maintaining the directional bearings constant between such intervals of connection of the received radio signals to the common system for amplifying them.

5. A radio directional receiving system comprising a plurality of rotatable directional antennae having individual motive drives; a radio frequency receiver unit connected to each of said antennae; an amplifier and control system connectible to the output of each of said receiver units; and switching means for successively connecting the output of each receiver unit to the input of said amplifier and control system while correspondingly connecting the output thereof to the respective motive drives to orientate their associated rotatable antennae into directional bearing relationship with radio signals received by said receiver units.

6. A radio directional receiving system comprising two rotatable directional antennae having individual reversible motor drives; a radio frequency receiver unit connected to each of said antennae; an amplifier and control system connectible to the output of each of said receiver units; switching means for successively and intermittently connecting the output of each receiver unit to the input of said amplifier and control system while correspondingly connecting the output thereof to said reversible motor drives to orientate their associated rotatable antennae into directional bearing relationship with received radio signals; and an indicator coupled with each of said rotatable antennae to indicate their bearing positions.

7. A radio directional receiving system comprising two rotatable directional antennae having individual reversible motor drives; a radio frequency receiver unit connected to each of said antennae; an amplifier and control system connectible to the output of each of said receiver units; electro-mechanical switching means for successively and intermittently connecting the output of each receiver unit to the input of said amplifier and control system while correspondingly connecting the output thereof to said reversible motor drives to orientate their associated rotatable antennae into directional bearing relationship with received radio signals; and an indicator coupled with each of said rotatable antennae to indicate their bearing positions.

8. A radio directional receiving system comprising two rotatable directional antennae having individual reversible motor drives; a radio frequency receiver unit connected to each of said antennae; an amplifier and control system connectible to the output of each of said receiver units; switching means for successively and intermittently connecting the output of each receiver unit to the input of said amplifier and control system while correspondingly connecting the output thereof to said reversible motor drives to orientate their associated rotatable antennae into directional bearing relationship with radio signals received by said receiver units; a pair of antenna position indicators; and a telemetering arrangement connecting each indicator to one of said directional antennae to indicate the bearing position thereof.

9. A radio directional receiving system comprising a plurality of rotatable directional antennae having individual motive drives; a radio frequency receiver unit connected to each of said antennae; an amplifier and control system connectible to the output of each of said receiver units; switching means for successively connecting the output of each receiver unit to the input of said amplifier and control system while correspondingly connecting the output thereof to the respective motive drives to orientate their associated rotatable antennae into directional bearing relationship with radio signals received by said receiver units; said switching means comprising a drum contactor having two diametrically oppositely disposed sets of discontinuous contact segments, brush means for connecting each of said sets to one of said antennae and one of said reversible motor drives, a set of continuous contact segments connected to each set of discontinuous contact segments and brush means connecting the last-named set to the input and output of said amplifier and control system; and mechanism for rotating said drum at a substantially constant speed.

10. A radio directional receiving system comprising a pair of concentrically mounted rotatable directional antennae mounted in a common housing and having individual reversible motor drives; a radio frequency receiver unit connected to the winding of each of said antennae; an amplifier and control system connectible to the output of each of said receiver units; synchronous switching means for successively and intermittently connecting the output of each receiver unit to the input of said amplifier and control system while correspondingly connecting the output thereof to said reversible motor drives to orientate their associated rotatable antennae into directional bearing relationship with radio signals received by said receiver units; and a pair of coaxial antenna position indicating pointers each coupled to one of said antennae to indicate the bearing position thereof.

11. A radio directional receiving system comprising a pair of concentrically mounted rotatable directional antennae mounted in a common housing and having individual reversible motor drives; a radio frequency receiver unit connected to the winding of each of said antennae; an amplifier and control system connectible to the output of each of said receiver units; synchronous switching means for successively and intermittently connecting the output of each receiver unit to the input of said amplifier and control system while correspondingly connecting the output thereof to said reversible motor drives to orientate their associated rotatable antennae into directional bearing relationship with radio signals received by said receiver units; and a pair of coaxial antenna position indicating pointers each coupled to one of said antennae to indicate the bearing position thereof; said switching means comprising a drum contactor having two diametrically oppositely disposed sets of discontinuous contact segments, brush means for connecting each of said sets to one of said antennae and one of said reversible motor drives a set of continuous contact segments connected to each set of discontinuous contact segments and to the input and ouput of said amplifier and control system and mechanism including a constant speed motor for rotating said drum at a substantially constant speed.

12. A radio directional receiving system comprising a pair of concentrically mounted rotatable directional antennae mounted in a common housing and having individual reversible motor drives; a radio frequency receiver unit connected to the winding of each of said antennae; an amplifier and control system connectible to the output of each of said receiver units; synchronous switching means for successively and intermittently connecting the output of each receiver unit to the input of said amplifier and control system while correspondingly connecting the output thereof to said reversible motor drives to orientate their associated rotatable antennae into directional bearing relationship with radio signals received by said receiver units; a pair of coaxial antenna position indicating pointers; and a telemetering arrangement connecting each pointer to one of said directional antennae to indicate the bearing position thereof.

13. A direction finder system comprising a pair of directional receiving circuits, one being tunable to the carrier frequency of one station, the other being tunable to the carrier frequency of another station; a pair of utilization circuits, common amplifier and detector means coupling said utilization circuits to said directional receiving circuits, and means for causing both said directional receiving circuits and said utilization circuits to be alternately operative at a similar periodicity whereby each of said utilization circuits will be responsive in accordance with the output of only one of said directional receiving circuits.

14. A direction finder system comprising a pair of directional receiving circuits, one being tunable to the carrier frequency of one station, the other being tunable to the carrier frequency of another station, means for alternately suppressing the output of each of said directional receiving circuit which is time displaced from the correspondingly interrupted output of the other directional receiving circuit, common means for amplifying said time displaced outputs, and means for subsequently utilizing such amplified outputs in the guiding of a vehicle along a predetermined course.

15. A direction finder system comprising a pair of directional receiving circuits, one being tunable to the carrier frequency of one station, the other being tunable to the carrier frequency of another station, means for alternately suppressing the output of each of said directional receiving circuits to produce an interrupted output of one directional receiving circuit which is time displaced from the correspondingly interrupted output of the other directional receiving circuit, common means for amplifying and detecting said time displaced outputs, a pair of branch utilization circuits coupled to said common amplifying and detecting means, and means for alternately rendering said branch circuits responsive to the output of said common amplifying and detecting means at the same rate as the alternate suppression of said directional receiving circuits, whereby each of said branch utilization circuits is caused to respond in accordance with the output of one of said directional receiving circuits.

16. A direction finding system comprising a pair of directional receiving circuits, one being tunable to the carrier frequency of transmission of one station, the other being tunable to the carrier frequency of another station, amplifying means common to said pair of directional receiving circuits and adapted to amplify the output from each of said directional receiving circuits, a pair of utilization circuits coupled to said common amplifying means and adapted to function in accordance with signal variations in the output of said directional receiving circuits, means for periodically and alternately suppressing the signal output from said directional receiving circuits to said common amplifier means, and means for periodically and alternately rendering said utilization circuits responsive to signal energy from said common amplifier means and at the same periodicity as the suppression of the receiving circuit output to said common amplifying means whereby each utilization circuit can be made to respond exclusively to the signal variations of but one of said pair of directional receiving circuits.

WILLIAM P. LEAR.

REFERENCES CITED

The following references are of record in the file of this patent:

UNITED STATES PATENTS

| Number | Name | Date |
| --- | --- | --- |
| 2,158,584 | Koster | May 16, 1939 |
| 2,190,039 | Neufeld | Feb. 13, 1940 |
| 2,199,402 | Hegenberger | May 7, 1940 |
| 2,279,246 | Podliasky et al. | Apr. 7, 1942 |
| 2,361,956 | Moseley | Nov. 7, 1944 |
| 2,368,921 | Greene et al. | Feb. 6, 1945 |